United States Patent
Höök (10) Patent No.: US 12,099,130 B2
(45) Date of Patent: Sep. 24, 2024

(54) MULTI-CHANNEL ACTIVE ARRAY SYSTEM AND METHOD FOR OBTAINING POSITIONAL INFORMATION OF AN OBJECT

(71) Applicant: SAAB AB, Linköping (SE)

(72) Inventor: Anders Höök, Hindås (SE)

(73) Assignee: SAAB AB, Linkoping (SE)

( * ) Notice: Subject to any disclaimer, the term of this patent is extended or adjusted under 35 U.S.C. 154(b) by 0 days.

(21) Appl. No.: 18/686,754

(22) PCT Filed: Aug. 18, 2022

(86) PCT No.: PCT/SE2022/050756
§ 371 (c)(1),
(2) Date: Feb. 26, 2024

(87) PCT Pub. No.: WO2023/033693
PCT Pub. Date: Mar. 9, 2023

(65) Prior Publication Data
US 2024/0272261 A1 Aug. 15, 2024

(30) Foreign Application Priority Data
Aug. 31, 2021 (SE) .................................. 2100129-2

(51) Int. Cl.
*G01S 3/14* (2006.01)
*G01S 3/06* (2006.01)
*G01S 13/04* (2006.01)

(52) U.S. Cl.
CPC ...... *G01S 3/14* (2013.01); *G01S 3/06* (2013.01); *G01S 13/04* (2013.01)

(58) Field of Classification Search
CPC .... H01Q 21/00; H01Q 21/061; H04B 7/0413; G01S 3/14; G01S 3/06; G01S 13/04;
(Continued)

(56) References Cited

U.S. PATENT DOCUMENTS

| 7,167,508 B2 * | 1/2007 | Lin ........................ H04B 7/086 375/147 |
| 10,705,176 B2 * | 7/2020 | Mesecher ................. G01S 3/46 |

(Continued)

FOREIGN PATENT DOCUMENTS

| CN | 110824414 A | 2/2020 |
| CN | 110837075 A | 2/2020 |

(Continued)

OTHER PUBLICATIONS

International Search Report and Written Opinion for Patent Cooperation Treaty Application No. PCT/SE2022/050756, dated Sep. 9, 2022, 14 pages.

*Primary Examiner* — Olumide Ajibade Akonai
(74) *Attorney, Agent, or Firm* — Alston & Bird LLP (57) ABSTRACT

An antenna arrangement (1) comprising an antenna array is disclosed. The antenna array comprises N antenna elements (2) (N being an integer ≥3). Moreover, each antenna element is connected to an electronics module (3) out of P electronics modules, P being an integer such that 3≤P≤N, where each electronics module is configured to generate an output signal indicative of a signal received by a corresponding one or more antenna elements. The antenna arrangement further comprises control circuitry (10) connected to the antenna array. The control circuitry is configured to receive each output signal, compute a sum of cross-correlations between each output signal and a set of other output signals originating from other corresponding antenna elements, and determine at least one angle of a direction of arrival of the electromagnetic waves relative to the antenna array based on the computed sum.

15 Claims, 6 Drawing Sheets

(58) Field of Classification Search
CPC .... G01S 13/584; G01S 13/931; G01S 13/325; G01S 7/352; G01S 7/354
See application file for complete search history.

(56) References Cited

U.S. PATENT DOCUMENTS

| | | | |
|---|---|---|---|
| 2003/0003924 A1* | 1/2003 | Lin | H04W 64/00 |
| | | | 455/456.1 |
| 2003/0081503 A1 | 5/2003 | Barnard | |
| 2006/0208947 A1* | 9/2006 | Tsuchihashi | G01S 3/74 |
| | | | 342/417 |
| 2017/0074962 A1 | 3/2017 | Badawy | |
| 2018/0306887 A1* | 10/2018 | Robinson | G01S 3/48 |

FOREIGN PATENT DOCUMENTS

| | | | |
|---|---|---|---|
| EP | 1177456 B1 * | 6/2005 | G01S 3/06 |
| GB | 2568741 A * | 5/2019 | G01S 13/325 |
| WO | WO 2014/190074 A1 | 11/2014 | |

\* cited by examiner

MULTI-CHANNEL ACTIVE ARRAY SYSTEM AND METHOD FOR OBTAINING POSITIONAL INFORMATION OF AN OBJECT

CROSS REFERENCE TO RELATED APPLICATIONS

This application is a National Stage Application, filed under 35 U.S.C. § 371, of International Application No. PCT/SE2022/050756, filed Aug. 18, 2022, which international application claims priority to and the benefit of Swedish Application No. 2100129-2, filed Aug. 31, 2021; the contents of both of which as are hereby incorporated by reference in their entireties.

BACKGROUND

Related Field

The present invention generally relates to determining the origin of electromagnetic radiation, and in particular to processing of signals received by a multi-channel digital antenna array system.

Description of Related Art

Radar can be described as an object-detection system that uses electromagnetic waves to determine the range to, direction towards, and velocity of external objects. It may for example be used to detect aircraft, ships, motor vehicles, weather formations, as well as imaging terrain.

The modern uses of radar are accordingly very diverse, including air and terrestrial traffic control, marine radars to locate landmarks and other ships, aircraft anti-collision systems, ocean surveillance systems, and so forth.

Conventionally a radar system includes a transmitter producing electromagnetic waves in the radio or microwave domains, a transmitting antenna, a receiving antenna (often the same antenna is used for transmitting and receiving), at least one receiver and processor(s) to determine properties of the object(s). Electromagnetic waves (pulsed or continuous) from the transmitter reflect off the object and return to the receiver, giving information about the object's location and radial velocity and subsequently velocity. In aviation, an aircraft is usually equipped with a radar system that can be used to warn of aircraft or other obstacles in or approaching their path, display weather information, and give accurate altitude readings.

Thus, there is a need in the art for increasing the detection range of state-of-the-art, purpose-built passive radar systems and for retaining the detection range of state-of-the-art, digital radar systems when either operating in a passive mode to reduce contribution to RF pollution, or alternately or concurrently operating with the active radar mode in order to increase the awareness in all directions and/or in a wider frequency band.

As always, the improvement in performance shall preferably be made without increasing the mass, size, cost and complexity of the system or platform.

BRIEF SUMMARY

It is therefore an object of the present invention to provide an antenna arrangement, an aircraft comprising such an antenna arrangement, a vehicle comprising such an antenna arrangement, a method for detecting an object by means of a radar system, and a corresponding computer-readable storage medium, which alleviate all or at least some of the drawbacks of presently known solutions.

This object is achieved by means of an antenna arrangement, an aircraft comprising such an antenna arrangement, a vehicle comprising such an antenna arrangement, a method for detecting an object by means of a radar system, and a corresponding computer-readable storage medium as defined in the appended claims. The term exemplary is in the present context to be understood as serving as an instance, example or illustration.

According to a first aspect of the present invention, there is provided an antenna arrangement comprising an antenna array for receiving electromagnetic waves. The antenna array comprises N antenna elements (N being an integer $\geq 3$). Moreover, each antenna element is connected to an electronics module out of P electronics modules, P being an integer such that $3 \leq P \leq N$, where each electronics module is configured to generate an output signal indicative of a signal received by a corresponding one or more antenna elements. The antenna arrangement further comprises control circuitry connected to the antenna array. The control circuitry is configured to receive each output signal, compute a sum of cross-correlations between each output signal and a set of other output signals originating from other corresponding antenna elements, and determine at least one angle of a direction of arrival of the electromagnetic waves relative to the antenna array based on the computed sum.

Accordingly, the relationship between the antenna elements may be one-to-one, such that each antenna element is associated with one electronics module and consequently one output signal. In other words, in some embodiments P=N. This may for example be utilized in arrays having a lower number of antenna elements (e.g. 8 or 16 antenna elements). In the case of antenna arrangements having double polarized elements, it is herein considered that each such "elements" constitutes two antenna elements as discussed herein. Thus, an antenna arrangement having 12 double polarized elements may produce 24 output signals, but in the context of the present invention, such an antenna arrangement is considered to have 24 antenna elements producing the 24 output signals.

However, in some embodiments, there is a higher number of antenna elements than electronics modules, where the antenna elements have partitioned into sub-groups, where each sub-group is associated with a corresponding electronics module generating an output signal for each sub-group. This may for example be utilized in arrays having a higher number of antenna elements (e.g. 512 elements). Here, the antenna elements may be arranged in 64 subgroups, such that 8 antenna elements are associated with a common electronics module. The selection of which antennas should pertain to which subgroup may for example be based on a spatial position of the individual elements in the array such that elements that are in close proximity to each other form a sub-group.

Some advantages of the antenna arrangement according to any one of the embodiments disclosed herein includes:
- An increased detection range realised by an increase of the SNR.
- An improvement in azimuthal angular resolution capability.
- An improved capacity of extracting a reference signal from the emitter.
- An improved capacity to suppress the strong reference signal whilst searching for weak echoes.

A capability to estimate the elevation angle towards the object.

An ability to suppress ground or sea clutter echoes.

Moreover, another advantage of the antenna arrangement according to any one of the embodiments disclosed herein is that there is no need for any knowledge of the emission source to be able to determine a direction towards an object. In other words, there is no need for transmitter/receiver (T/R) coordination when the antenna arrangement is operating in a direction finding only mode.

According to a second aspect of the present invention, there is provided an aircraft comprising an antenna arrangement according to any one of the embodiments disclosed herein.

According to a third aspect of the present invention, there is provided a ground-vehicle comprising an antenna arrangement according to any one of the embodiments disclosed herein.

According to a fourth aspect of the present invention there is provided a method for detecting an object by means of a radar system comprising an antenna array for receiving electromagnetic waves. The antenna array comprises N antenna elements (N being an integer ≥3). Each antenna element is connected to an electronics module out of P electronics modules, P being an integer such that 3≤P≤N, and each electronics module is configured to generate an output signal indicative of a signal received by a corresponding one or more antenna elements. The method comprises receiving each output signal, and computing a sum of cross-correlations between each output signal and a set of other output signals originating from other corresponding antenna elements. The method further comprises determining at least one angle of a direction of arrival of the electromagnetic waves relative to the antenna array based on the computed sum. With this aspect of the invention, similar advantages and preferred features are present as in the previously discussed first aspect of the invention.

According to a fifth aspect of the present invention, there is provided a computer-readable storage medium storing one or more programs configured to be executed by one or more processors of an antenna signal processing system, the one or more programs comprising instructions for performing the method according to any one of the embodiments disclosed herein. With this aspect of the invention, similar advantages and preferred features are present as in the previously discussed first aspect of the invention.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF THE FIGURES

Further objects, features and advantages of embodiments of the invention will appear from the following detailed description, reference being made to the accompanying drawings, in which:

FIG. 3b shows the resulting cross-correlation of the signals from FIG. 3a.

DETAILED DESCRIPTION OF VARIOUS EMBODIMENTS

In the following detailed description, embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs), Field Programmable Gate Arrays (FPGA) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

Figure 1:
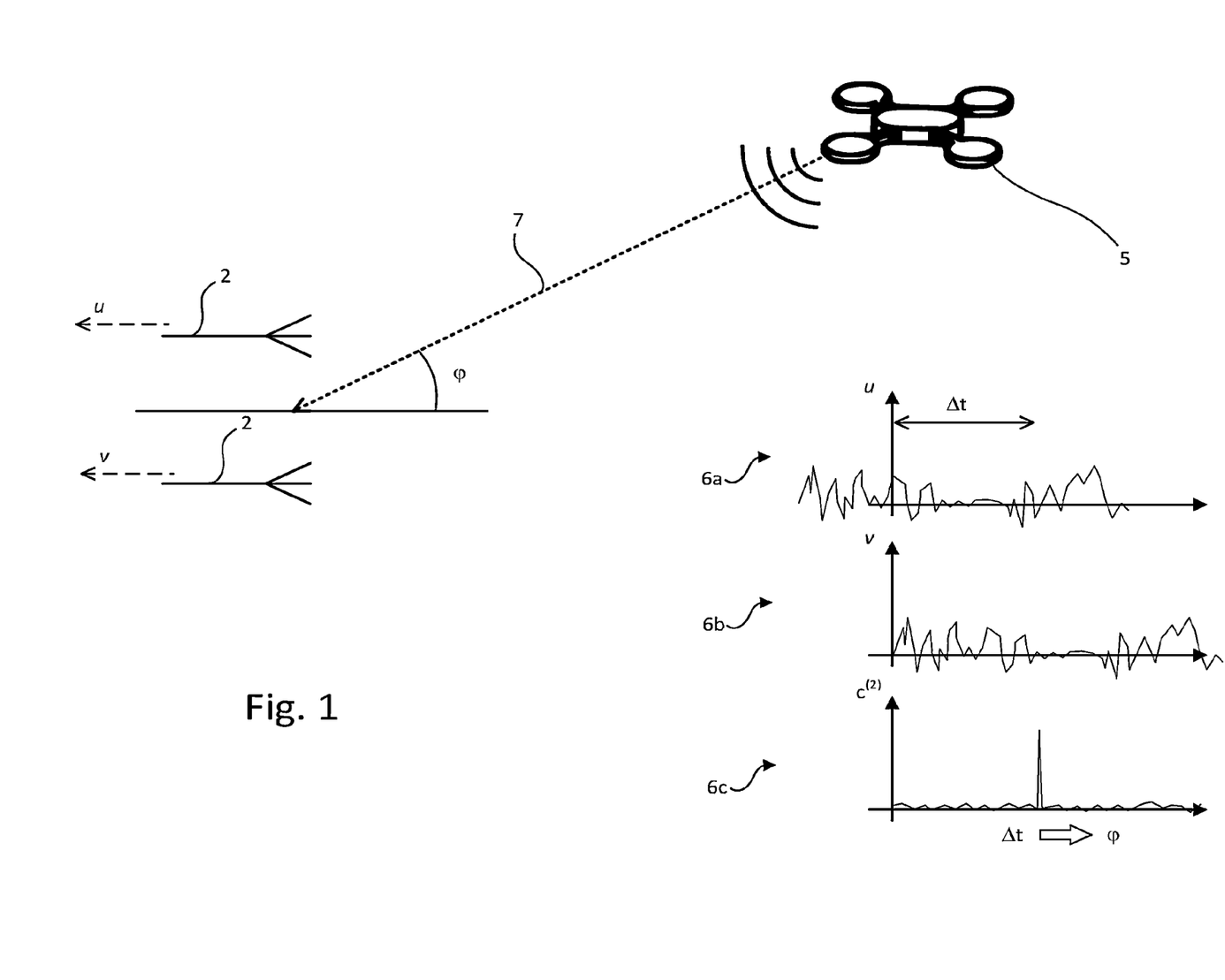
FIG. 1 is a schematic illustration of two antenna elements receiving a signal reflected off an object of interest and the corresponding digitized signals and their cross-correlation in accordance with an embodiment of the present invention.

FIG. 1 is a schematic illustration of two antenna elements 2 each receiving an electromagnetic wave 7 that has been reflected off or emitted from an object of interest 5 and the corresponding digitized signals (u, v) and their cross-correlation ($c^{(2)}$) in accordance with an embodiment of the present invention. Accordingly, FIG. 1 serves to illustrate some of the basic principles of the present invention, where a signal 7 from a distant object 5 is received and digitized into two channels u and v. Both of the digitized signals u and v are schematically illustrated in the graphs in the right part of FIG. 1. The graphs 6a, 6b show the signal as a function of time.

Once the digitized signals (i.e. output signals) have been received or obtained, a cross correlation is performed. The continuous representation of the cross-correlation reads:

$$c^{(2)}(\tau) = \int_{-t_0}^{t_0} [u^*(t)v(t+\tau)]dt \qquad (2)$$

In the illustrated example, there are only two output signals, wherefore there is only one cross-correlation to be formed.

As shown in the cross-correlation graph 6c, a peak is visible for $c^{(2)}(i)$ when $\tau=\Delta t$. The direction of the received signal relative to the antenna arrangement is deductible from the obtained peak in $c^{(2)}(i)$. In more detail, an angle indicative of the direction of arrival (DoA), here represented by $\varphi$, of the electromagnetic wave 7 may be determined based on the relationship described by equation (2) below.

$$\Delta t = \frac{d_x \sin(\varphi)}{c_0} \qquad (2)$$

Figures 2A, 2B, 2C:
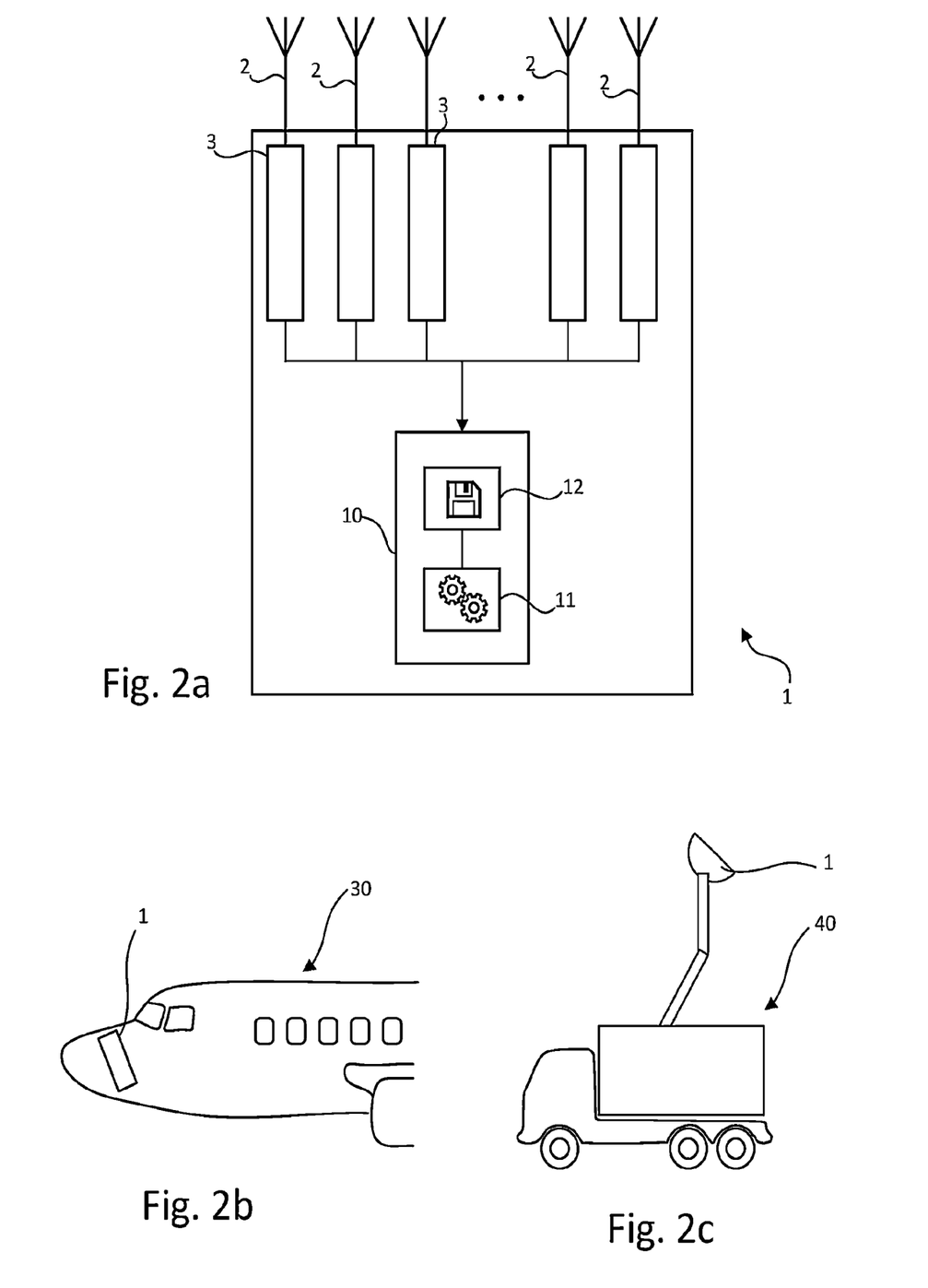
FIG. 2a is a schematic block representation of an antenna arrangement in accordance with an embodiment of the present invention.
FIG. 2b is a schematic illustration of an aircraft comprising an antenna arrangement in accordance with an embodiment of the present invention.
FIG. 2c is a schematic illustration of a ground vehicle comprising an antenna arrangement in accordance with an embodiment of the present invention.

FIG. 2 is a schematic block representation of an antenna arrangement 1 in accordance with an embodiment of the present disclosure. The antenna arrangement 1 comprises an antenna array for receiving electromagnetic waves, and has N antenna elements 2 (where N is an integer≥3). In some embodiments, the antenna elements 2 are (e.g. equidistantly) separated along a straight line. Furthermore, in some embodiments, the antenna elements 2 are arranged along a circular arc or a circle and where N≥5. The antenna elements 2 may be equidistantly separated along the circular arc or circle. Moreover, in some embodiments, the antenna elements are partitioned over two or more circles, separated along a common symmetry axis (e.g. vertically oriented on a fixed mast).

In some embodiments, the antenna elements 2 are arranged on two-dimensional (2D) surface (e.g. planar or cylindrical surface). In other words, the antenna elements 2 may be arranged in a flat 2D array having N=M×L antenna elements 2, where M and L are integers ≥2. Alternatively, the N=M×L antenna elements 2 may be arranged on a two-dimensional surface forming a single-curved cylindrical surface with a circular cross-section. The antenna elements may be regularly separated along the cylindrical surface.

Moving on, each antenna element 2 is connected to an electronics module 3 out of P electronics modules, P being an integer such that 3≤P≤N, where each electronics module 3 is configured to generate an output signal indicative of a signal received by a corresponding antenna element. The antenna arrangement 1 further has control circuitry 10 connected to the electronics modules 3, where the control circuitry 10 is configured to receive the output signals generated by the electronics modules 3. The antenna arrangement is, in some embodiments, realized as an AESA where the electronic modules 3 are receiving (Rx) modules or the receiving part of receive/transmit (Tx/Rx) or transceiver (TRX) modules.

Further, the control circuitry 10 is configured to obtain or receive each output signal from the electronics modules 3, and to compute a sum of cross-correlations between each output signal and a set of other output signals originating from other corresponding antenna elements 2. In particular, in some embodiments, the control circuitry 10 is configured to compute the compute a sum of cross-correlations by computing a generalized cross-correlation function between each output signal and a set of other output signals originating from other corresponding antenna elements 2. Moreover, the control circuitry 10 is configured to determine at least one angle of a direction of arrival of the electromagnetic waves relative to the antenna array 1 based on the computed sum. The antenna arrangement 1 may be provided on a moving platform (such as e.g. an aircraft 30 or on a ground vehicle 40 as depicted in FIGS. 2b and 2c respectively). However, the antenna arrangement may also be provided on fixed installations, ships, satellites, or on other airborne platforms than aircraft. In the following, it is assumed that each antenna element is connected to a separate electronics module such that N=P, i.e. a one-to-one ratio between the antenna elements and electronics modules. This is however, not to be construed as limiting to the present invention, but merely a choice to facilitate the understanding of the concepts disclosed hereinafter. As mentioned, in some embodiments, there is a higher number of antenna elements than electronics modules, where the antenna elements have partitioned into sub-groups, where each sub-group is associated with a corresponding electronics module generating an output signal for each sub-group. This may for example be utilized in arrays having a higher number of antenna elements (e.g. 512 elements). Here, the antenna elements may be arranged in e.g. 64 subgroups, such that 8 antenna elements are associated with a common electronics module.

Thereby it is possible to reduce the computational power needed to utilize the herein proposed methods/concepts with negligible effect on system performance.

In more detail, for the 1D-case (i.e. antenna elements arranged in one-dimensional array), a generalized cross-correlation function may be represented by Equation (3) below.

$$c^{(N)}(\tau) = \int_{-t_0}^{t_0} F(t,\tau)dt \qquad (3)$$

Where F(t, τ) in the case of a linear array is given by Equation (4).

$$F(t,\tau) = \sum_{i=1}^{N-1}\sum_{j=i}^{N-1} [u_i(t+(i-1)\tau)]^* \cdot u_{j+1}(t+j\cdot\tau) \qquad (4)$$

Here, $u_i$ denotes the output signal originating from each individual antenna element i. Given that the order of integration and summation can be interchanged, reference is made to $c^{(N)}(i)$ in Equation (3) as a generalized cross-correlation, being a sum of cross-correlations.

$$F(t,\tau) = \begin{aligned} &[u_1(t)]^* \cdot [u_2(t+\tau) + \ldots + u_N(t+(N-1)\tau)] + \\ &[u_2(t+\tau)]^* \cdot [u_3(t+(3-1)\tau) + \ldots + u_N(t+(N-1)\tau)] + \\ &\quad \vdots \\ &[u_{N-2}(t+(N-3)\tau)]^* \cdot [u_{N-1}(t+(N-2)\tau) + u_N(t+(N-1)\tau)] + \\ &[u_{N-1}(t+(N-2)\tau)]^* \cdot [u_N(t+(N-1)\tau)] \end{aligned} \quad (5)$$

Accordingly, for the 1D-case (i.e. antenna elements arranged in one-dimensional array) the control circuitry 10 may be configured to compute a first function of one temporal dimension i, being a first integral of a first sum of $N(N-1)/2$ combinations between each (properly time-offset) output signal with every other (properly time-offset) output signal according to a predefined scheme. Thereby, one angle, representing a direction of arrival of the electromagnetic waves relative to the antenna array may be determined based on the first function. The explicit appearance of $\tau$ in Equations (4) and (5) may simplify the extraction of a discretely represented signal value at any given and discretely represented time, thus contributing to the speed of the evaluation of $c^{(N)}$.

The first function may be given by $c^{(N)}(\tau)$ according to equations 6 and 7 below. $F(t,\tau)$ as defined in equation 7 holds for any one-dimensional array, such as e.g. linear arrays or circular arrays.

$$c^{(N)}(\tau) = \int_{-t_0}^{t_0} F(t,\tau)dt \quad (6)$$

$$F(t,\tau) = \sum_{i=1}^{N-1}\sum_{j=i}^{N-1} \left[u_i\left(t+f\left(i-1, \tau(r_i, \hat{k})\right)\right)\right]^* \cdot u_{j+1}\left(t+f\left(j, \tau(r_{j+1}, \hat{k})\right)\right) \quad (7)$$

Here, i and j denote individual elements, $r_i$ denote the 2D coordinates of antenna element i relative to a reference point, and where $r_{j+1}$ denotes the 2D coordinates of antenna element j+1 relative to said reference point. Moreover, $\hat{k}$ denotes a 2D unit vector representing the direction in a reference coordinate system towards the object of interest from the reference point. Further, f represents an offset in time series of u, where f—like t—is discrete, that is integer-valued in digital applications. The object of interest here being an object from which electromagnetic waves have been reflected off, or an object that emits electromagnetic waves.

In either case, it is an object of interest and the angle(s) of the direction towards the object of interest relative to the antenna arrangement is(are) the parameter(s) to be determined.

Moreover, in some embodiments, and in particular for (straight) linear arrays, the offset may be written/defined as:

$$f(i,\tau) = \text{Int}(\alpha \cdot i) \cdot \tau \quad (8)$$

where $\alpha$ is a real constant $\neq 0$ useful to represent an adaptation to a specific implementation, and Int( ) is an operation that makes the real valued product $\alpha \cdot i$ become integer valued.

Still further, for elements placed along a circular arc or a complete circle, the relation between the angle of direction of arrival of the electromagnetic wave, i.e. the angle of the direction towards the object of interest, and the offset may be given by.

$$f(i,\tau) = \text{Int}(\beta \cdot (\cos(\varphi)\cos(\Phi_i) + \sin(\varphi)\sin(\Phi_i))) \quad (9)$$

Here, $\beta$ is a real constant $\neq 0$, $\varphi$ represents the angle of the direction towards the object of interest that determines $\hat{k}$, and $\Phi_i$ is the angle towards antenna element i. In Equation (9), the offset f is no longer proportional to an explicit $\tau$ implying that a number of probed directions $\varphi$ must first be given, and then the corresponding offsets f can be determined.

However, for the 2D-case (i.e. antenna elements arranged in a two-dimensional array) the control circuitry 10 may be configured to compute a second function of two temporal dimensions, being a second generalized cross-correlation between each (properly time-offset) output signal with every other (properly time-offset) output signal according to a predefined scheme. Thereby, two angles, representing a direction of arrival of the electromagnetic waves relative to the reference coordinate system, i.e. relative to the antenna array may be determined based on the second function.

The second function may be given by $c^{(M,L)}(\tau_{az},\tau_{el})$ according to equations 10 and 11 below.

$$c^{(M,L)}(\tau_{az},\tau_{el}) = \int_{-t_0}^{t_0} G(t,\tau_{az},\tau_{el})dt \quad (10)$$

$$G(t,\tau_{az},\tau_{el}) = \sum_{i=1}^{M-1}\sum_{j=i}^{M-1}\sum_{k=1}^{L-1}\sum_{l=k}^{L-1} \Psi$$

$$\Psi = \left[u_{i,k}\left(t+f(i-1,\tau_{az}(r_i,\hat{k}))+g(k-1,\tau_{el}(r_i,\hat{k}))\right)\right]^* \cdot \left[u_{j+1,l+1}\left(t+f(j,\tau_{az}(r_{j+1},\hat{k}))+g(l,\tau_{el}(r_{l+1},\hat{k}))\right)\right]$$

where l, j, k, and l denote individual elements, $r_i$ denote the coordinates of antenna element i relative to a reference point, and where $\hat{k}$ denotes a unit vector representing the direction in a reference coordinate system towards the object of interest from the reference point.

It should be noted that Equations (10) and (11) is a representation where the N elements have been regularly arranged over the two-dimensional surface in e.g. M rows and L columns, the total number of elements thus being N=M*L. A regular arrangement is not a restriction of the present invention, since all elements over a two-dimensional surface can be expressed by the Equations (6) and (7). However, Equations (10) and (11), were chosen in order to elucidate the more common M*L array realizations over irregular ones.

Similar to the 1D-case, in some embodiments, and specifically for planar 2D arrays, $f(i,\tau) = g(i,\tau) = \text{Int}(\alpha \cdot i) \cdot \tau$, where $\alpha$ is a real constant $\neq 0$.

Still further, the angles of direction of arrival of the electromagnetic wave, i.e. the two angles of the direction towards the target or object of interest (may also be an emitter), for a cylindrical 2D array, may be deducted from equations 12 below.

$$g(i,\tau) = \text{Int}(\alpha \cdot i) \cdot \tau$$

$$f(i,\tau) = \text{Int}(\beta \cdot (\cos(\varphi p)\cos(\Phi_i) + \sin(\varphi)\sin(\Phi_i))) \quad (12)$$

Here, $\alpha$, $\beta$ are real constants $\neq 0$, $\varphi$ represents the azimuth angle of the direction towards the emitter that determines $\hat{k}$, and $\Phi_i$ is the azimuth angle towards antenna element i. In more detail, Equations (12) is a simplification of the general case, where the determination of the elevation angle, the establishment of which is facilitated by the top equation of the Equations (12), is "small", while the determination of the azimuth angle is facilitated by the bottom equation of the Equations (12). This simplification was introduced to illustrate the connection to previous stated Equations (4), (5), (8) and (9). The general expression can be derived by considering the unit vector $\hat{k}$ towards the object of interest in terms of the universally understood spherical angles $\theta$ and $\varphi$:

$$\hat{k} = \hat{x}\sin\theta\cos\varphi + \hat{y}\sin\theta\sin\varphi + \hat{z}\cos\theta, \quad (13)$$

and by considering the three-dimensional vectors $r_i$ from the reference point to the antenna positions:

$$r_i = \hat{x}x_i + \hat{y}y_i + \hat{z}z_i \quad (14)$$

by the aid of which the offset in arrival time at the antenna element i can be expressed.

The predefined scheme defines which output signals are comprised in the "set of other output signals". In other words, the predefined scheme defines which output signals are to be cross-correlated in the sum of cross-correlations. For example, in some embodiments, the set of other output signals is every other output signal originating from every other corresponding antenna element 2 such that the computed sum is an integral of a sum of $N(N-1)/2$ combinations.

Alternatively, in some embodiments, the set of other output signals is every other output signal originating from non-neighbouring antenna elements in at least one dimension, wherein non-neighbouring antenna elements 2 are defined by a minimum separation between the antenna elements 2. Accordingly, in some embodiments, the control circuitry is configured to only compute a sum of cross-correlations between each output signal and each output signal originating from a non-neighbouring antenna element. In other words, in some embodiments, the set of other output signals comprises only the output signals originating from the non-neighbouring antenna elements.

More specifically, in some embodiments the antenna elements 2 are arranged in a one-dimensional array. Accordingly, the non-neighbouring antenna elements 2 are antenna elements 2 that are non-adjacent antenna elements such that the combinations for the output signal associated with antenna element $u_n$ and the output signals associated with antenna elements $u_{n-1}$, $u_{n+1}$ are omitted.

Further, in some embodiments, the antenna elements 2 are arranged in a two-dimensional array. Accordingly, the non-neighbouring antenna elements 2 are antenna elements 2 that are non-adjacent antenna elements such that the combinations of the output signal associated with antenna element $u_{m,n}$ and any one of the output signals associated with antenna elements $u_{m-1,n}$, $u_{m+1,n}$, $u_{m,n-1}$, $u_{m,n+1}$ are omitted. Furthermore, additionally or alternatively, the closest diagonal elements may also be excluded such that the combinations of the output signal associated with antenna element $u_{m,n}$ and any one of the output signals associated with antenna elements $u_{m-1,n-1}$, $u_{m+1,n-1}$, $u_{m-1,n+1}$, $u_{m+1,n+1}$ are omitted.

However, for both the 1D case and the 2D case, non-neighbouring antenna elements may include antenna elements that are within two "steps", three "steps", or more. For example, for the 1D case, the combinations of the output signal associated with antenna element $u_n$ and any one of the output signals associated with antenna elements $u_{n-1}$, $u_{n+1}$, $u_{n-2}$, and $u_{n-2}$ are omitted.

By omitting the neighbouring antenna elements in the cross-correlation process, problems associated with correlated noise may be mitigated or reduced. If the noise is correlated between digital channels, the sensitivity of the antenna arrangement 1 may be reduced.

Moreover, even though the control circuitry 10 is illustrated as an integrated part of the antenna arrangement 1, it should be understood that the control circuitry 10 may also be provided as a separate device outside of the antenna arrangement which is in communicative connection with the electronic modules 3 of the antenna arrangement. For example, the control circuitry 10 may be implemented at a site remote to the antenna arrangement.

The control circuitry 10 (may also be referred to as a controller or control unit) has one or more processors 11 and a memory unit 12. The processor(s) 11 (associated with the control circuitry 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

Figure 3A:
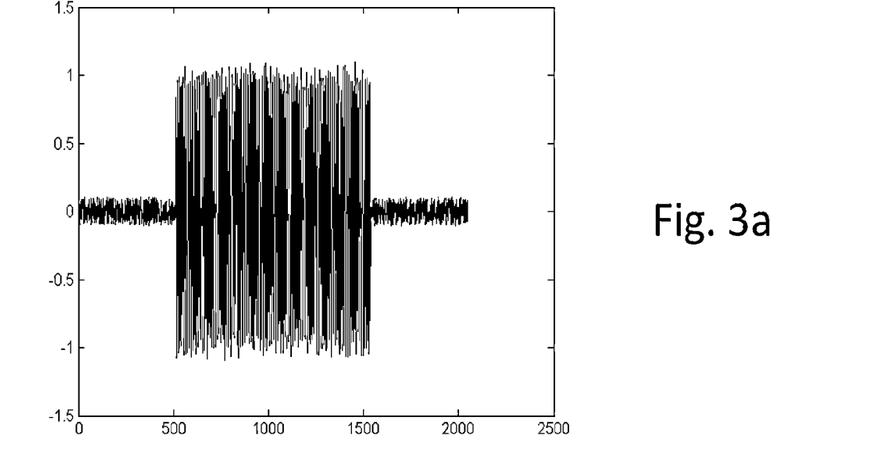
FIG. 3a is a graph showing one of two similar signals each having a small amount of noise present.
Figure 3B:
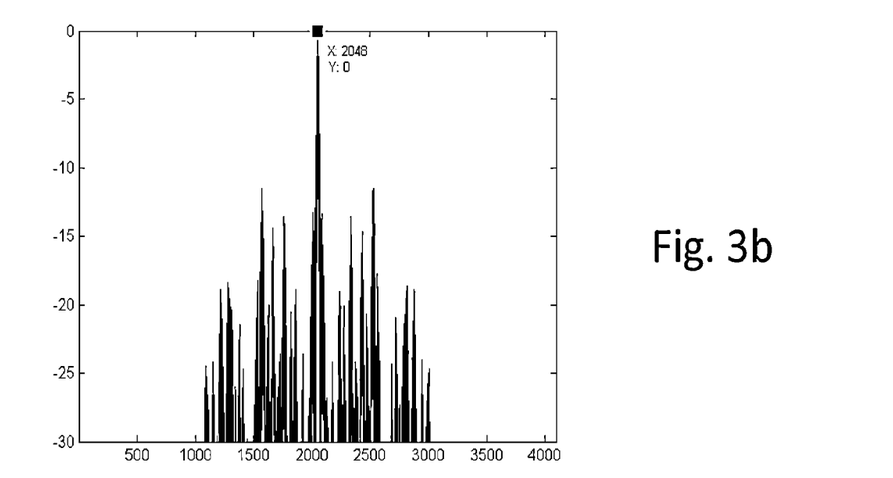

FIGS. 3a-3c, 4a-4c, 5a-5c illustrate (through simulation) the performance improvement of the antenna arrangement and method as disclosed herein for determining the direction towards an object of interest (from which electromagnetic waves are reflected or emitted) relative to the antenna arrangement. In relation to FIG. 3a-3b, an incoming wave—here of limited duration—is sampled by two antenna elements into two channels (i.e. N=2). Here, the wave reaches the antenna elements simultaneously, implying $\varphi=0$, and the wave carries a $\pm\pi/2$ Phase Shift Keying (PSK) modulation. In FIG. 3a, representing any of the two output signals, a small amount of noise is present with SNR=+20 dB. FIG. 3b illustrates the resulting cross-correlation $c^{(2)}$, which peaks at $\Delta t=\varphi=0°$. The contrast of the peak designating the angle towards the object of interest relative to the maximum of the other peaks in the $c^{(2)}$ function is at 11.5 dB.

Figure 4A:
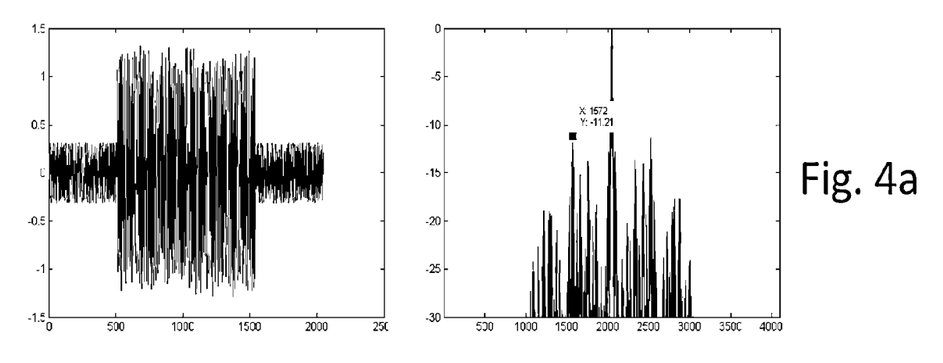
FIGS. 4a-4c show the signals from FIG. 3a with increasingly added noise and the resulting cross-correlation of the signals.
Figure 4B:
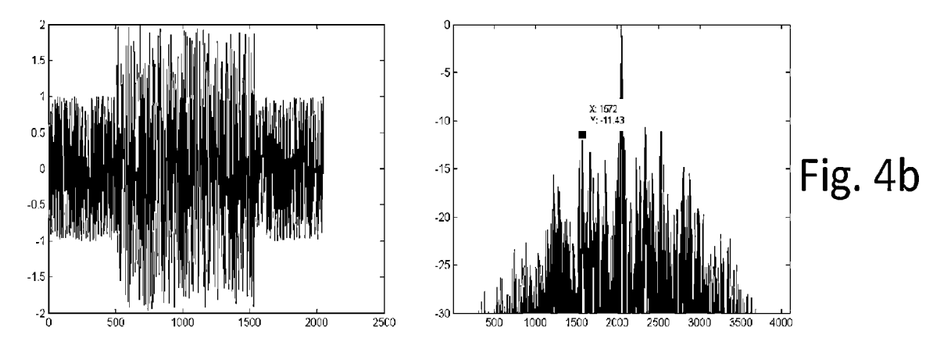
Figure 4C:
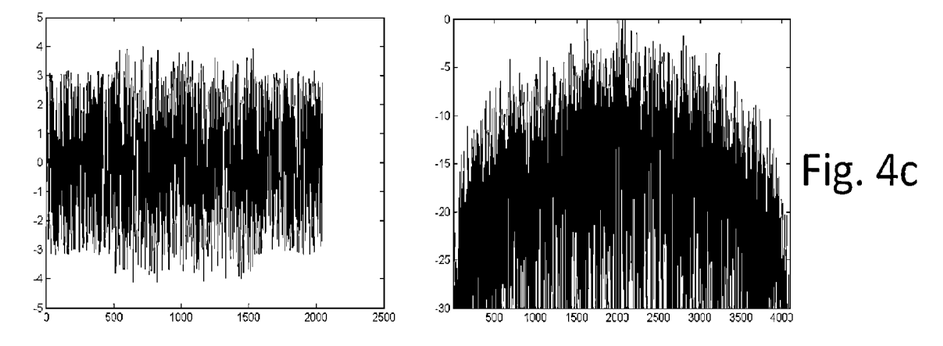

FIGS. 4a-4c illustrate the performance of the same simulated setup as in FIGS. 3a-3c, however, with increasing noise added to the sampled pulses in the two channels. In FIG. 4a the channel SNR is set to +10 dB, and the resulting contrast for the $c^{(2)}$ function is still sufficient to permit determination of an angle of a direction towards the object of interest. In FIG. 4b, the channel SNR is set to 0 dB, and the resulting contrast of the $c^{(2)}$ function is still sufficient to permit determination of an angle of a direction towards the object of interest. However, in FIG. 4c, the channel SNR is set to −10 dB, and the resulting contrast of the $c^{(2)}$ function is too low to permit determination of an angle of a direction towards the object of interest, i.e. direction finding (DF) is no longer possible.

Figure 5A:
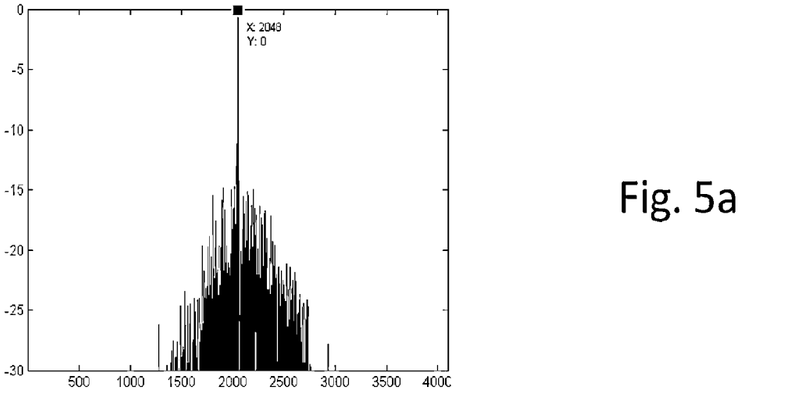
FIG. 5a is a graph showing the resulting signal from a cross-correlation of the output signals with the same amount of added noise as FIG. 4c but where the output signals are obtained from a simulation of an incoming wave that has been sampled by eight antenna elements into eight channels.
Figure 5B:
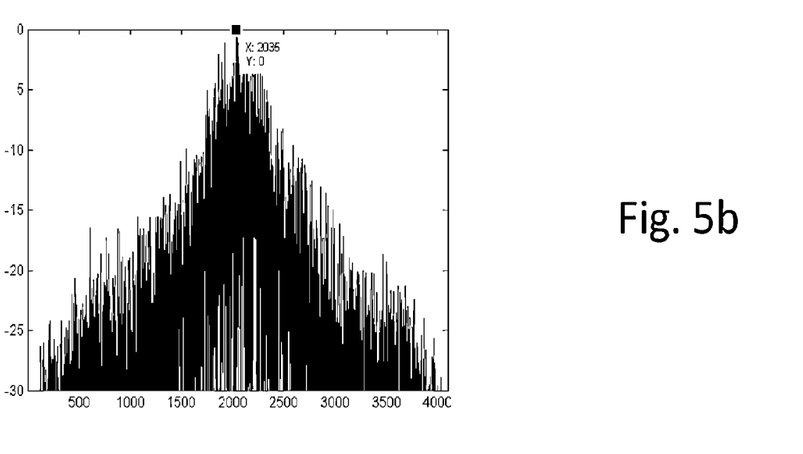
FIG. 5b is a graph showing the resulting signal from a cross-correlation of the output signals with more added noise as compared to FIG. 5a but where the output signals are obtained from a simulation of an incoming wave that has been sampled by eight antenna elements into eight channels.
Figure 5C:
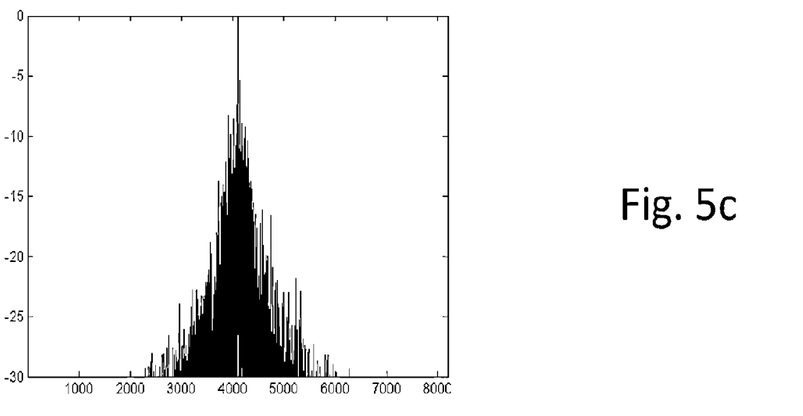
FIG. 5c is a graph showing the resulting signal from a cross-correlation of the output signals with the same amount of added noise as FIG. 5b but where the output signals are obtained from a simulation of an incoming wave that has been sampled by sixteen antenna elements into sixteen channels.

FIGS. 5a-5c show analogous simulations as for FIGS. 3a-3c and FIGS. 4a-4c, but where the number of antenna elements N are incrementally increased to illustrate the performance of larger antenna arrays employing the concepts disclosed herein. In FIG. 5a, the channel SNR is set to −10 dB in each of eight channels (i.e. N=8), and the resulting contrast of the $c^{(8)}$ function now permits determination of an angle of a direction towards the object of interest. However, in FIG. 5b, the channel SNR is set to −20 dB in each of the eight channels and the resulting contrast of the $c^{(8)}$ function does not permit a determination of an angle of a direction towards the object of interest, ruining the DF capability. In FIG. 5c, the number of antenna elements (and accordingly the number of channels) was doubled to sixteen (i.e. N=16), with the same channel SNR as in FIG. 5b (i.e. −20 dB). As illustrated in FIG. 5c, it is now possible to determine an angle of a direction towards the object of interest.

As indicated by the results presented in FIGS. 5a-5c, the resulting contrast of the $c^{(N)}$ function is improved by increasing the number of antenna elements in the antenna array. It can be demonstrated that the contrast $\Delta C$ of the $c^{(N)}$ function is proportional to:

$$\Delta C \propto \sqrt{N(N-1)/2} \quad (15)$$

provided that the signal is not to repetitive in character and that the noise contributions are uncorrelated. Thus, by increasing the number of antenna elements, a more robust or a more long-range direction finding (DF) may be achievable.

In accordance with the foregoing, the direction of arrival of the electromagnetic waves relative to the antenna array (i.e. direction towards an object of interest) can be determined without any knowledge of a transmitter waveform, a transmitter position, or even of the existence of a transmitter. In other words, the antenna arrangement may be used as a passive receiver for more sensitive and more accurate determination of a direction towards the object of interest using the above principles.

However, in order to determine a distance to the object of interest, further parameters, are used. In more detail, in some embodiments the antenna arrangement is part of a passive bistatic radar function. Accordingly, in order to determine the distance to the object of interest the following parameters should preferably be obtained/retrieved/received.

Positional data of an emitter arranged to emit electromagnetic waves towards an object of interest. The positional data is indicative of a position of the emitter, and may either be in the form of absolute terms (e.g. GPS coordinates) or relative to the antenna arrangement. However, in some embodiments, the positional data is also indicative of a velocity of the emitter (e.g. deducted from a series of positions). The velocity of the emitter may be directly supplied by the emitter or inferred based on other associated data (e.g. time stamped positions). Thereby, the position of the emitter at an arbitrary point in time may be estimated.

Emission data associated with the emitter. The emission data is indicative of waveform information of the emitted electromagnetic waves, where the waveform information defines a reference signal. In some embodiments, the reference signal is a digital waveform. The emission data may either be extracted and reconstructed by the antenna arrangement or obtained as e.g. a database entry submitted by the emitter.

Time stamps of the received signals. The antenna arrangement may mark or stamp the time of the received signals that have been reflected off the object of interest.

A time reference of the emitted electromagnetic waves towards the object of interest, i.e. a time reference of the emission. The receiver may determine the time reference from the recorded, direct signal (i.e. signal transmitted from the emitter directly towards the antenna arrangement/receiver). Alternatively, the emitter may transmit the time reference as supplementary information/data within or in addition to the emitted signal.

In some embodiments, the antenna arrangement's 1 control circuitry 10 may also be used in conjunction with other signal processing methods known to experts in the field, such as, but not limited to reference signal extraction, digital reference signal reconstruction, utilization of symbol characteristics, signal-embedded time referencing and/or Doppler hypothesis testing. For example, the control circuitry 10 may be configured to develop a number of differently manipulated reference signals that by a standard procedure may contribute to the knowledge of the velocity of the object of interest.

Figure 6:
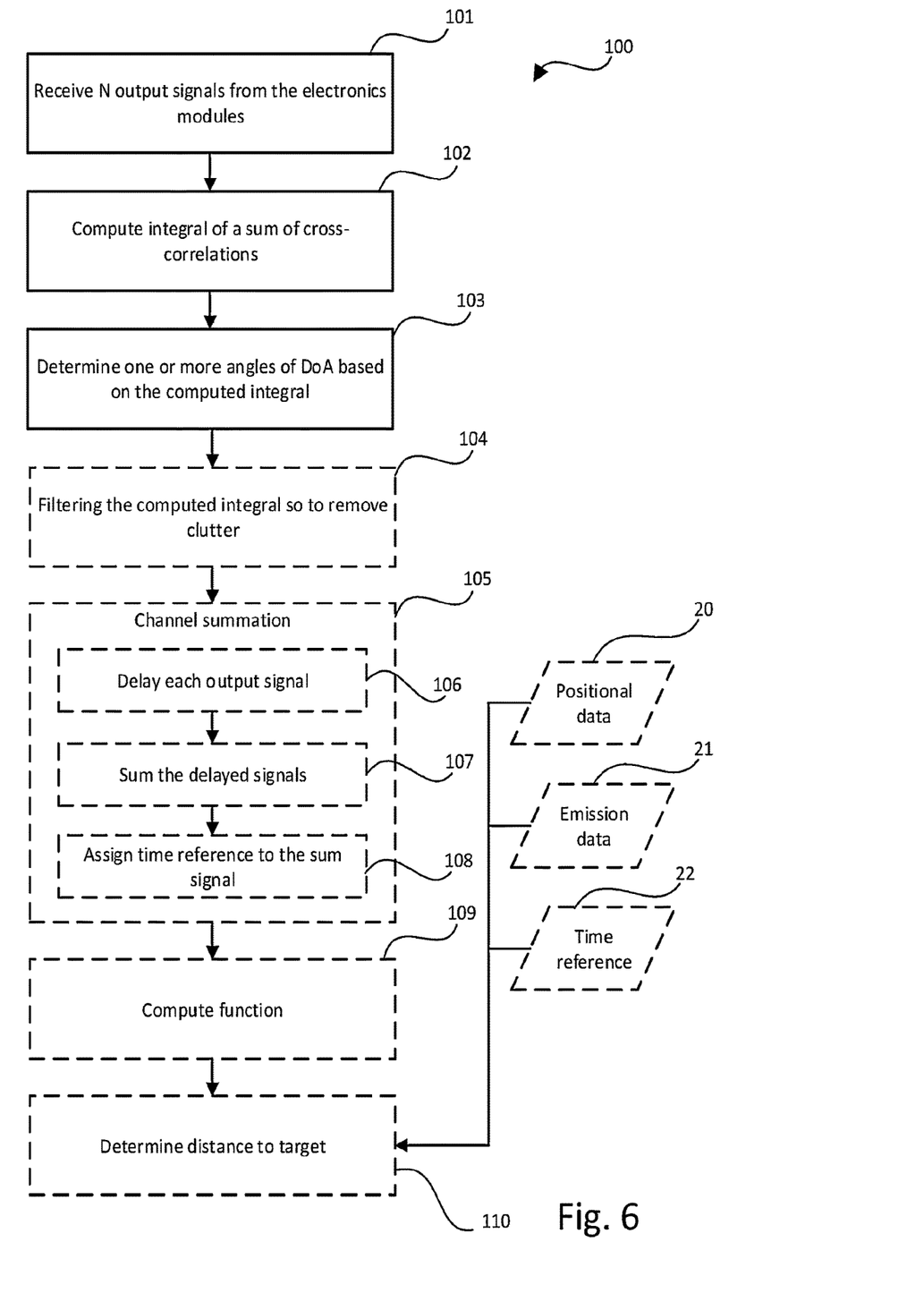
FIG. 6 is a schematic flow chart representation of a method for detecting a target by means of a radar system comprising an antenna array for receiving electromagnetic waves in accordance with an embodiment of the present invention.

The estimation of the distance to the object of interest will be further elucidated in reference to the flow chart illustrated FIG. 6, and in particular for how the antenna arrangements and the methods described herein can realize a passive radar capability.

FIG. 6 is a schematic flow chart representation of a method 100 for detecting an object of interest (or for acquiring object of interest data) by means of a radar system comprising an antenna array for receiving electromagnetic waves. In other words, by means of an antenna arrangement as disclosed herein. In more detail, the antenna array comprises N antenna elements, N being an integer ≥3, where each antenna element is connected to an electronics module. Each electronics module is configured to generate an output signal indicative of a signal received by a corresponding antenna element.

The method 100 comprises obtaining or receiving 101 each of the N output signals from the electronics modules, and computing 102 a sum of cross-correlations (or a generalized cross-correlation) between each output signal and a set of other output signals originating from other corresponding antenna elements. Furthermore, the method 100 comprises determining 103 at least one angle of a direction of arrival of the electromagnetic waves relative to the antenna array based on the computed 102 sum. The computational steps 102, 103 have been described and exemplified in detail with reference to FIG. 2 in the foregoing, and will for the sake of brevity and conciseness not be repeated. However, as the skilled person readily realizes, analogous examples and embodiments are applicable for the method 100 disclosed herein.

Further, in some embodiments, the method 100 comprises filtering the computed 102 sum e.g. to remove clutter. The "filtering" process/step may be understood as a removal of parts of the computed 102 sum or as a manipulation of the computation 102. In more detail, for the 2D-case (i.e. when the antenna elements are arranged in a 2D-array), the method 100 may comprise determining an elevation angle and an azimuth angle defining the direction of arrival of the electromagnetic waves relative to the antenna array based on the computed 102 sum. Then, the computed 102 sum is filtered so to remove any part of the computed sum corresponding to a combination of elevation angles and azimuth angles for elevation angles that are below a threshold value. In other words, the method 100 may comprise a step of removing any part of the second function (see equations 8 and 9 above) corresponding to a combination of elevation and azimuth angles that reside within at least one domain. The combination of elevation and azimuth angles that reside within at least one domain may correspond to elevation angles below a threshold value.

In particular, for aircraft applications, signals that originate from the direction of the ground surface (most likely clutter) may effectively be suppressed by removing any part of the computed sum corresponding to a combination of elevation angles and azimuth angles for elevation angles that are below a threshold value.

Moving on, the method 105 may further comprise a channel summation 105 step in order to obtain an SNR-improved and time referenced sum signal for enabling a distance estimation to the object of interest. In more detail, the method 100 may comprise delaying 106 (or offsetting in time) each output signal individually based on the determined direction of arrival (i.e. based on the determined 103 angle(s)) and an antenna geometry (i.e. based on the position of each corresponding antenna element's in the antenna array). The delay or offset 106 process provides a synchronization of the output signals. Further, the method 100 may comprise summing 107 the delayed or offset signals in order to obtain an SNR-improved sum signal and extracting 108 a time reference of the sum signal.

Further, the method 100 comprises obtaining positional data 20 of one or more emitters arranged to emit electromagnetic waves, including waves propagating towards an object of interest, where the positional data is indicative of a position of the emitter. In some embodiments, the positional data 20 may be in the form of a time series of time-referenced position and velocity data of one or more emitters potentially emitting electromagnetic waves towards the object of interest. The method 100 may further comprise obtaining emission data associated with at least one emitter, where the emission data comprises waveform information of the emitted electromagnetic waves towards the object of interest, and where the waveform information defines a reference signal. In other words, the method 100 may further comprise obtaining or receiving emission data 21 associated with the emitter(s), the emission data 21 comprising waveform information of the emitted electromagnetic waves in order to form a reference signal. The method 100 may further comprise obtaining a time reference 22 related to the emitted electromagnetic waves towards the object of interest.

Further, the method 100 comprises computing 109 a function by either one of:

Cross-correlating each output signal with the reference signal in order to obtain a set of N first signals and offsetting the first signal(s) based on the determined direction of arrival and the position of the antenna element associated with the output signal.

Cross-correlating the sum signal (obtained from the channel summation 105) with the reference signal;

In other words, one may utilize the channel summation (in which the output signals first have been individually offset) or one may account for the time delay of each signal obtained from the cross-correlation of each output signals with the reference signal. It should be noted that this embodiment may be combined with the embodiments related to the omission of cross-correlation with the output signals originating from neighbouring antenna elements.

Further, the method comprises determining 110 a distance to the object of interest based on the time reference of the sum signal, the time reference of the emitted electromagnetic waves, the positional data 20, the determined 103 direction of arrival, and the computed 109 function.

In more detail, the distance to the object of interest may be calculated from Equation (16) below.

$$r_{rt} = \frac{(r_{ec} + r_{rt})^2 - r_{er}^2}{2(r_{ec} + r_{rt}) - 2r_{er}\cos(\varphi_{et})} \quad (16)$$

Here, r denotes the distance [m], indices/indexes e, r, and t represent the emitter, receiver and object of interest, respectively. Moreover, $\varphi_{et}$ denotes the angle between the bearings towards the emitter and the object of interest as seen from the receiver. Thus, $r_{et}$ is the distance between the emitter and object of interest, while $r_{et}+r_{rt}$ is a sum of unknowns but can be estimated by registering the time delay. Executable instructions for performing these functions are, optionally, included in a non-transitory computer-readable storage medium or other computer program product configured for execution by one or more processors.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a control device, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the disclosure may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present disclosure. Other solutions, uses, objectives, and functions within the scope of the disclosure as claimed in the below described patent embodiments should be apparent for the person skilled in the art.

The invention claimed is:

1. An antenna arrangement (1) comprising:
an antenna array for receiving electromagnetic waves, wherein the antenna array comprises N antenna elements (2), N being an integer >3, each antenna element being connected to a corresponding electronics module (3), each electronics module being configured to generate an output signal indicative of a signal received by a corresponding antenna element;
control circuitry (10) connected to the antenna array and configured to:
receive each output signal;
compute a sum of cross-correlations between each output signal and a set of other output signals originating from other corresponding antenna elements;
determine at least one angle of a direction of arrival of the electromagnetic waves relative to the antenna array based on the computed sum.

2. The antenna arrangement (1) according to claim 1, wherein the set of other output signals is every other output signal originating from every other electronics module such that the computed sum is a sum of $N(N-1)/2$ cross-correlations.

3. The antenna arrangement (1) according to claim 1, wherein the set of other output signals is every other output signal originating from electronics modules associated with non-neighbouring antenna elements in at least one dimension, wherein non-neighbouring antenna elements are defined by a minimum separation between the antenna elements (2).

4. The antenna arrangement (1) according to claim 3, wherein the antenna elements (2) are arranged in a one-dimensional array, and wherein the non-neighbouring antenna elements are antenna elements that are non-adjacent antenna elements such that the cross-correlation for the output signal associated with antenna element un is not performed together with any one of the output signals associated with antenna elements $u_{n-1}$, $u_{n+1}$.

5. The antenna arrangement (1) according to claim 3, wherein N is an integer ≥6 and the antenna elements are arranged on a two-dimensional, 2D, surface forming a 2D array, and wherein the non-neighbouring antenna elements are antenna elements that are non-adjacent antenna elements such that the cross-correlation for the output signal associated with antenna element $u_{m,n}$ is not performed together with any one of the output signals associated with antenna elements $u_{m-1,n}$, $u_{m+1,n}$, $u_{m,n-1}$, $u_{m,n+1}$.

6. The antenna arrangement (1) according to claim 1, wherein the control circuitry (10) is further configured to:
offset each output signal individually based on the determined direction of arrival and an antenna geometry,
sum the offset output signals in order obtain a sum signal; and
assign a time reference to the sum signal.

7. The antenna arrangement (1) according to claim 6, wherein the control circuitry (10) is further configured to:
receive or infer positional data (20) of an emitter arranged to emit electromagnetic waves towards an object, the positional data being indicative of a position of the emitter;
receive emission data (21) associated with the emitter, the emission data comprising waveform information of the emitted electromagnetic waves towards the object, the waveform information defining a reference signal;
obtain a time reference (22) of the emitted electromagnetic waves towards the object;
compute a function by:
cross-correlating each output signal with the reference signal in order to obtain a set of first signals and offsetting the first signal(s) based on the determined direction of arrival and a position of the antenna element(s) associated with the output signal, or
cross-correlating the sum signal with the reference signal;
determine a distance to the object based on the time reference of the sum signal, the time reference of the emitted electromagnetic waves, the positional data, the direction of arrival, and the computed function.

8. The antenna arrangement (1) according to claim 1, wherein N is an integer ≥3, and wherein the antenna elements (2) are arranged on a two-dimensional, 2D, surface forming a 2D array, and wherein the control circuitry (10) is configured to:
determine an elevation angle and an azimuth angle defining the direction of arrival of the electromagnetic waves relative to the antenna array based on the computed sum;
filter the computed sum so to remove part of the computed sum corresponding to a combination of elevation angles and azimuth angles for elevation angles that are below a threshold value.

9. An aircraft (30) comprising the antenna arrangement (1) according to claim 1.

10. A ground vehicle (40) comprising the antenna arrangement (1) according to claim 1.

11. A fixed installation comprising the antenna arrangement (1) according to claim 1.

12. A method (100) for detecting an object by means of a radar system comprising an antenna array for receiving electromagnetic waves, wherein the antenna array comprises N antenna elements, N being an integer ≥3, each antenna element being connected to a corresponding electronics module (3), each electronics module being configured to generate an output signal indicative of a signal received by a corresponding antenna element, the method comprising:
receiving (101) each output signal;
computing (102) a sum of cross-correlations between each output signal and a set of other output signals originating from other corresponding antenna elements;
determining (103) at least one angle of a direction of arrival of the electromagnetic waves relative to the antenna array based on the computed sum.

13. The method (100) according to claim 12, further comprising:
offsetting (106) each output signal individually based on the determined direction of arrival and an antenna geometry,
summing (107) the offset output signals in order obtain a sum signal; and
assigning (108) a time reference to the sum signal.

14. The method (100) according to claim 13, further comprising:
- obtaining positional data (20) of an emitter arranged to emit electromagnetic waves towards an object, the positional data being indicative of a position of the emitter;
- obtaining emission data (21) associated with at least one emitter, the emission data comprising waveform information of the emitted electromagnetic waves towards the object, the waveform information defining a reference signal;
- obtaining a time reference (22) of the emitted electromagnetic waves towards the object;
- computing (109) a function by:
  - cross-correlating each output signal with the reference signal in order to obtain a set of first signals and offsetting the first signal(s) based on the determined direction of arrival and a position of the antenna element(s) associated with the output signal, or
  - cross-correlating the sum signal with the reference signal;
- determining (110) a distance to the object based on the time reference of the sum signal, the time reference of the emitted electromagnetic waves, the positional data, the direction of arrival, and the computed function.

15. A non-transitory computer-readable storage medium storing one or more programs configured to be executed by one or more processors of an antenna signal processing system, the one or more programs comprising instructions for performing the method according to claim 12.

* * * * *

UNITED STATES PATENT AND TRADEMARK OFFICE
CERTIFICATE OF CORRECTION

| | | |
|---|---|---|
| PATENT NO. | : 12,099,130 B2 | Page 1 of 1 |
| APPLICATION NO. | : 18/686754 | |
| DATED | : September 24, 2024 | |
| INVENTOR(S) | : Anders Höök | |

It is certified that error appears in the above-identified patent and that said Letters Patent is hereby corrected as shown below:

In the Claims

In Column 15, Line 49, Claim 4, delete "un" and insert -- $u_n$ --, therefor.
In Column 15, Line 65, Claim 6, delete "order obtain" and insert -- order to obtain --, therefor.
In Column 16, Line 65, Claim 13, delete "order obtain" and insert -- order to obtain --, therefor.

Signed and Sealed this
Fourth Day of February, 2025

Coke Morgan Stewart
*Acting Director of the United States Patent and Trademark Office*